United States Patent [19]

Tamura et al.

[11] Patent Number: 4,989,538
[45] Date of Patent: Feb. 5, 1991

[54] APPARATUS FOR SPRINKLING RESIN COMPOSITION

[75] Inventors: Katsushige Tamura, Akashi; Shigehiro Yamamoto, Matsubara; Hideo Saijyo, Takatsuki, all of Japan

[73] Assignee: Nippon Shokubai Kagaku Kogyo Co., Ltd., Osaka, Japan

[21] Appl. No.: 426,202

[22] Filed: Oct. 25, 1989

[30] Foreign Application Priority Data

Oct. 26, 1988 [JP] Japan ................................. 63-271721
Oct. 26, 1988 [JP] Japan ................................. 63-271722
Oct. 26, 1988 [JP] Japan ................................. 63-271723
Oct. 26, 1988 [JP] Japan ................................. 63-271724

[51] Int. Cl.$^5$ .................................................. B05C 5/00
[52] U.S. Cl. ................................... 118/313; 118/315; 118/325; 156/62.2; 222/403; 222/423
[58] Field of Search ............... 118/302, 313, 315, 316, 118/324, 325; 156/62.2, 62.4, 356, 547, 550; 222/403, 423; 53/111 R

[56] References Cited

U.S. PATENT DOCUMENTS

| 2,860,973 | 11/1958 | Wells | ................................. 222/423 X |
| 3,158,668 | 11/1964 | Johnson | ........................ 156/62.4 X |
| 3,932,980 | 1/1976 | Mizutani et al. | ................... 53/111 R |
| 4,332,281 | 6/1982 | Baba | ................................. 222/423 X |

FOREIGN PATENT DOCUMENTS

| 0322874 | 7/1989 | European Pat. Off. . |
| 2501941 | 7/1975 | Fed. Rep. of Germany . |
| 2932457 | 3/1980 | Fed. Rep. of Germany | ...... 118/313 |
| 2571299 | 4/1986 | France . |
| 6097808 | 5/1985 | Japan . |
| 6189810 | 5/1986 | Japan . |

Primary Examiner—Richard L. Chiesa
Attorney, Agent, or Firm—Oblon, Spivak, McClelland, Maier & Neustadt

[57] ABSTRACT

Described herein is a resin composition sprinkling mechanism useful in the production of a fiber reinforced resinous molding material, the sprinkling mechanism employing a transfer roller which is resiliently abutted against a sprinkling roller rotating in a fixed position to sprinkle completely in finely divided form a liquid resin composition being transferred along the surface of the transfer roller, thereby permitting to produce continuously a fiber reinforced resinous molding material of uniform quality.

9 Claims, 3 Drawing Sheets

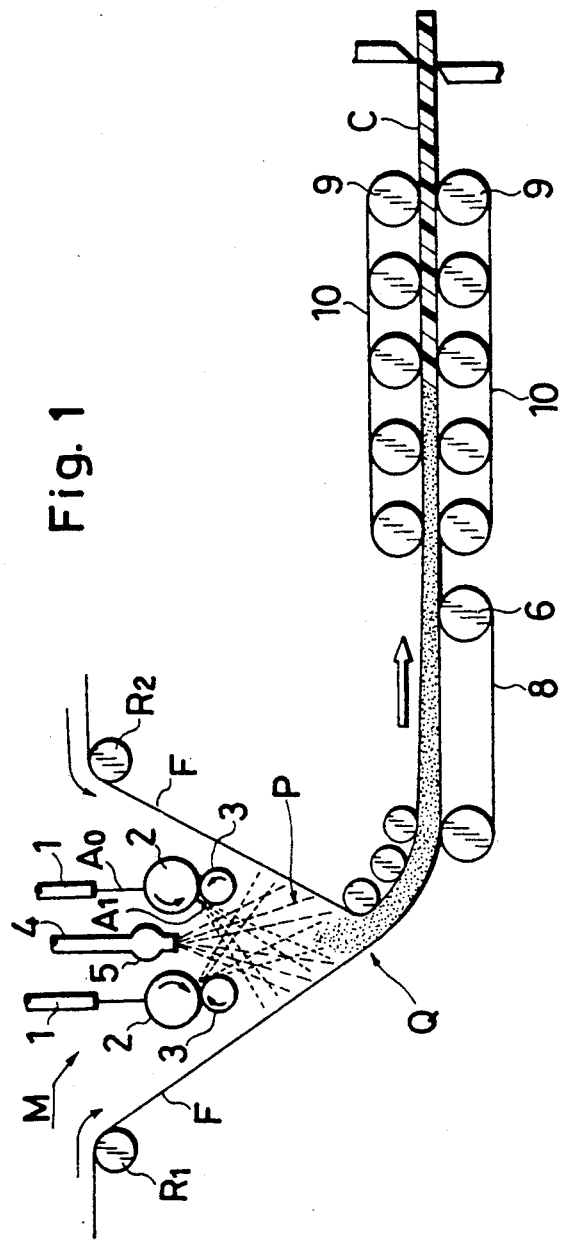
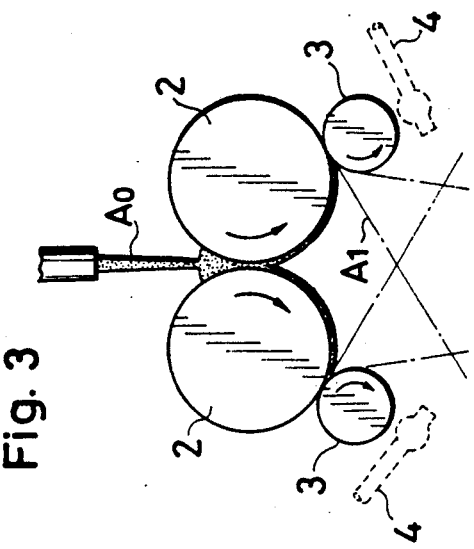
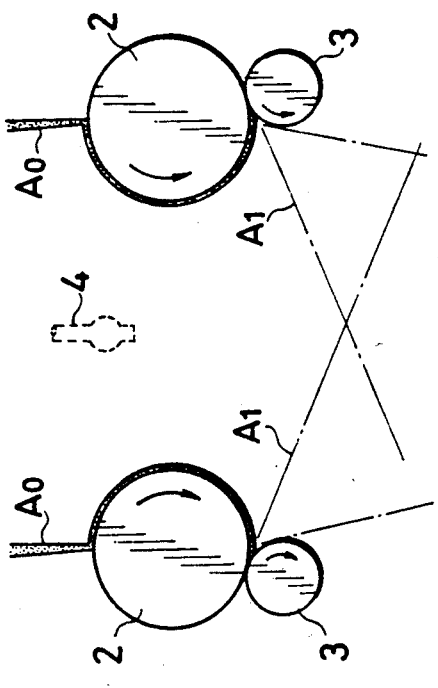

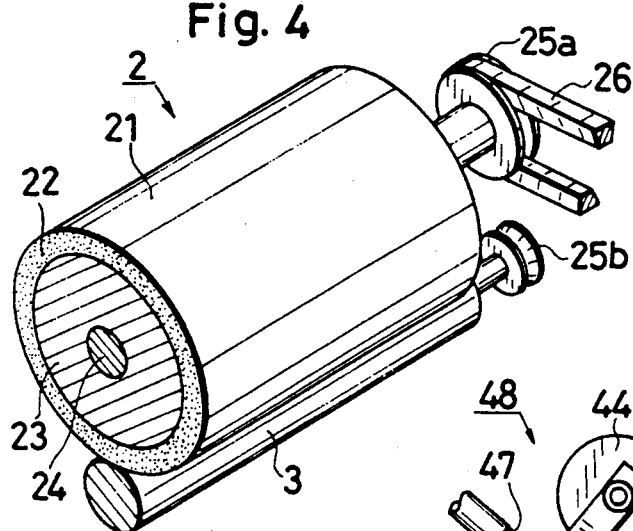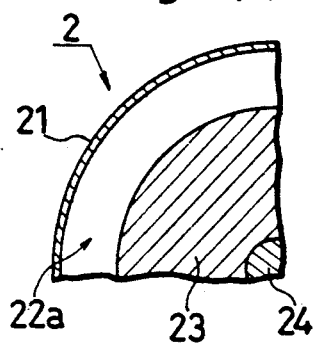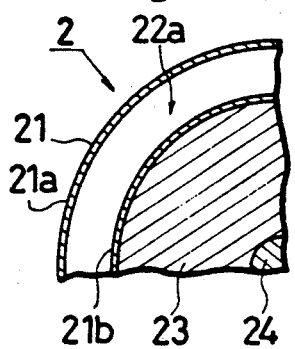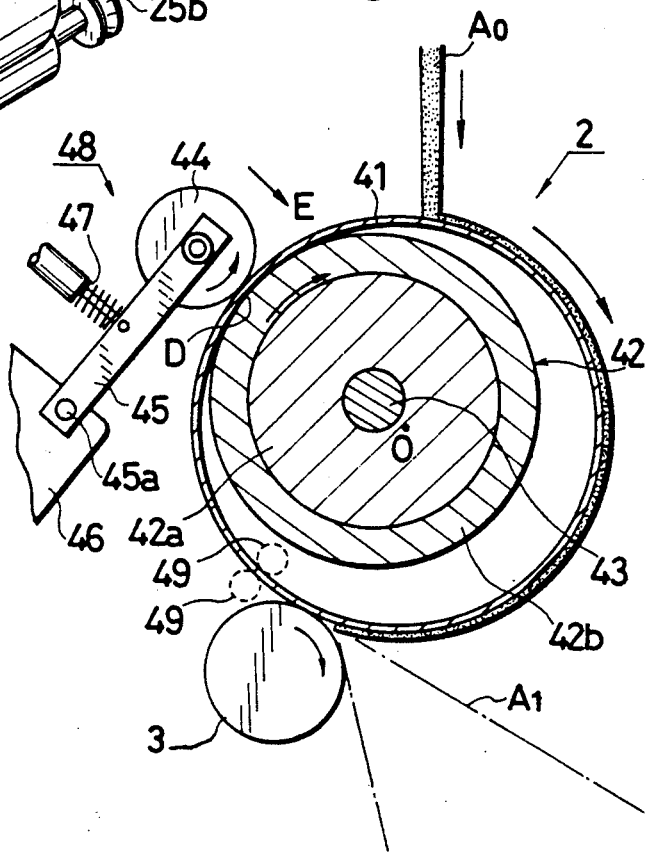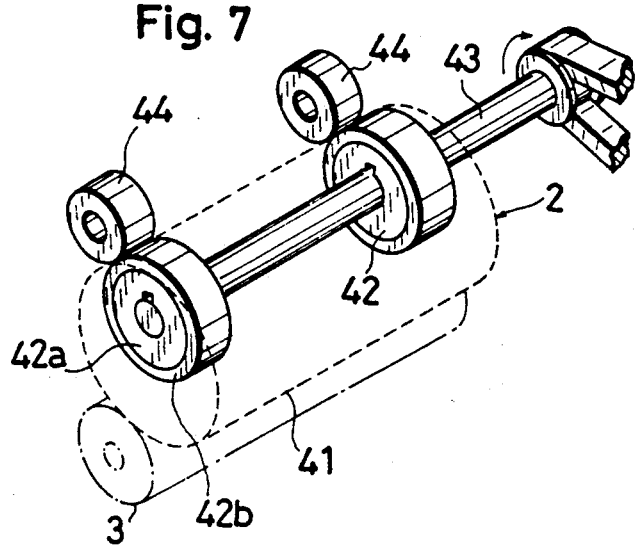

APPARATUS FOR SPRINKLING RESIN COMPOSITION

BACKGROUND OF THE INVENTION

1. Field of the Invention

This invention relates to an apparatus for uniformly sprinkling a liquid resin composition, which is useful, for example, in the process of preparing a resinous molding material like a sheet molding compound, a bulk molding compound or the like by mixing a liquid resin composition uniformly with reinforcing fiber.

2. Description of the Prior Art

In copending patent applications, Laid-Open Patent Application Nos. 60-97808 and 61-89810, the present inventors proposed methods for producing resinous molding materials by mixing a liquid resin composition uniformly with reinforcing fiber (e.g., chopped glass fiber).

The methods of the copending applications employs an apparatus which is equipped with a mechanism for sprinkling a liquid resin composition in combination with a feeder for reinforcing chopped fiber, dividing the resin composition into fine droplets and mixing same uniformly with the reinforcing chopped fiber to produce sheets or blocks of molding material continuously.

The sprinkling mechanism is composed of a transfer roller and a sprinkling roller which are disposed in parallel relation with each other and rotated in the same direction, leaving a clearance of 1–3 mm therebetween. The sprinkling roller is formed in a smaller diameter than the transfer roller, and rotated at a high speed of 3,000–10,000 r.p.m. while the transfer roller is put in low speed rotation of 100–1,000 r.p.m.

On the other hand, an outlet of a liquid resin composition feeder is opened over the transfer roller, and a thermosetting or thermoplastic resin composition fed onto the transfer roller from the feeder is moved downward as the transfer roller rotates and handed over onto the sprinkling roller which is located underneath. The resin composition on the surface of the transfer roller is scraped off by air streams which are formed by the high speed rotation of the sprinkling roller, and blown off in the form of globules or short fiber-like fine droplets. As a result, the resin composition which has been carried by the transfer roller is sprinkled from its surface. The sprinkled resin composition is mixed with the reinforcing fiber and, for example simply deposited to form blocks to be sent to a next stage as a resinous molding material. Alternatively it is deposited and shaped into a sheet-like or plate-like form between synthetic resin films which run in parallel relation with each other, while undergoing impregnation, defoaming and so forth before sent to a next stage as a resinous molding material such as SMC, BMC or the like.

In the above-described process, it is the usual practice to employ a resin composition with a viscosity of 200–2,000 poise. However, with a liquid resin composition in such a high viscosity range, it is difficult for the sprinkling roller to loosen and sprinkle the entire amount of the delivered resin composition, and it is often the case that part of the resin composition remains on the surface of the transfer roller as resin composition residues which might impair the uniformity of the resinous molding material to be produced, as will be explained hereinbelow. Namely, if the operation proceeds without completely replacing the deposited resin composition residues by fresh resin composition, the composition will get viscous more and more and finally solidify and block the roller clearance. Upon receiving a certain kind of impact or shock, for example, by the impact of contacting the sprinkling roller, fragments of the solidified resin composition come off the transfer roller surface and mingle into the mixture of the resin composition and reinforcing fiber, lowering the uniformity of the resinous molding material and increasing the defective rate of the molded products to be obtained from the resinous molding material.

SUMMARY OF THE INVENTION

It is a primary object of the present invention to provide a resin composition sprinkling mechanism which permits to produce a uniform resinous molding material continuously by preventing entrainment of fragments of solidified resinous material into a mixture of a resin composition and reinforcing fiber.

More particularly, in accordance with the present invention, there is provided a resin composition sprinkling mechanism which is capable of continuously sprinkling in a finely divided form the total amount of a resin composition delivered by a transfer roller irrespective of the viscosity of the resin composition and free of deposition of resin composition residues on the transfer roller.

The above and other objects, features and advantages of the invention will become apparent from the following description and the appended claims, taken in conjunction with the accompanying drawings which show by way of example some preferred embodiments of the invention.

BRIEF DESCRIPTION OF THE DRAWINGS

In the accompanying drawings:

FIG. 1 is a schematic illustration of a line for producing a sheet molding compound (SMC), incorporating a resin composition sprinkling mechanism according to the invention;

FIGS. 2 and 3 are diagrammatic side views of transfer rollers and sprinkling rollers according to the invention, showing examples of roller layout;

FIG. 4 is a partly sectioned view of a typical embodiment of the sprinkling mechanism according to the invention;

FIGS. 5(A) and 5(B) are fragmentary sectional views of other embodiments of the invention;

FIG. 6 is a sectional view of another embodiment of the invention;

FIG. 7 is a schematic perspective view of the transfer roller shown in FIG. 6;

DESCRIPTION OF PREFERRED EMBODIMENTS

Figure 8:
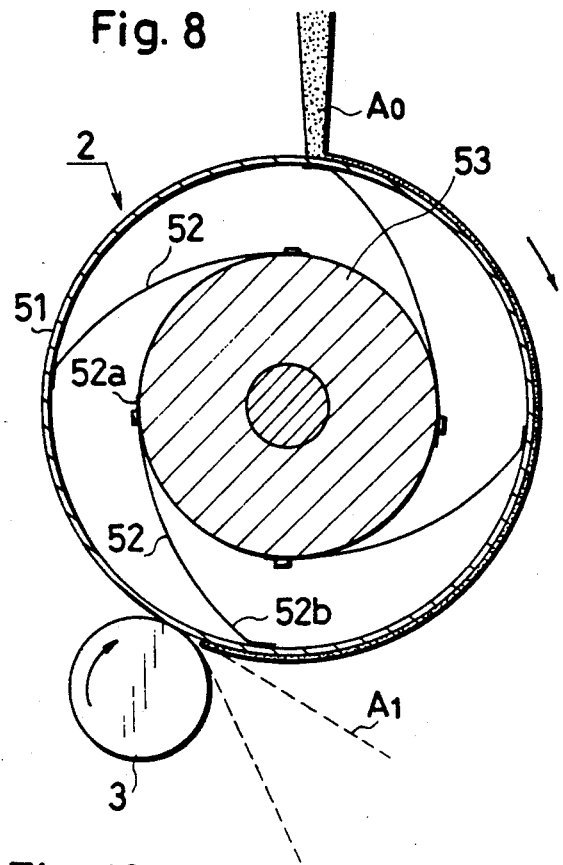
FIG. 8 is a schematic sectional view of a further embodiment of the invention.

Referring to FIG. 1, there is schematically shown a production line of a resinous molding material like a sheet molding compound, wherein a couple of polyethylene films F which are fed toward a sprinkling mechanism M according to the present invention from opposite sides thereof are turned downward via turning rollers $R_1$ and $R_2$ and brought into closely face-to-face relation in the vicinity of point Q. Past the point Q, the films F are fed parallelly in the arrowed direction. The sprinkling mechanism M according to the invention includes two pairs of transfer and sprinkling rollers 2 and 3. Located between the transfer and sprinkling roller pairs is a reinforcing fiber feeder 4 which scatters reinforcing short fiber P which has been cut into a predetermined length by a roving cutter 5.

As shown particularly in FIG. 2, the afore-mentioned transfer rollers 2 are positioned above the sprinkling rollers 3 to provide a couple of roller sets, the transfer rollers 2 receiving a supply of a liquid resin composition $A_o$ from above. Alternatively, the liquid resin composition $A_o$ may be supplied from above to a couple of transfer rollers 2 which are positioned side by side with a clearance of about 3–5 mm therebetween as shown in FIG. 3, locating the reinforcing fiber feeder 4 beneath each sprinkling roller 3.

The polyethylene films F are fed in tensioned state along guide rollers, and transferred forward by a transfer conveyer 8 and an impregnating/defoaming conveyer 10 in the direction of blank arrow as mentioned hereinbefore, and shaped into a sheet-or plate-like form sandwiching the mixture of the resin composition and reinforcing fiber between the films F. On the impregnating/defoaming conveyer 10, the mixture and films F are pressed from upper and lower sides, and the mixture is defoamed in pressed state to obtain a resinous molding material C of a sheet-or plate-like form.

The transfer roller 2 and sprinkling roller 3 of each roller set are positioned parallel with each other and rotated in the same direction in resiliently abutting engagement with each other. More specifically, the transfer roller 2 has a stratiform construction as shown in FIG. 4, including a rotary body 23 which is securely mounted on a drive shaft 24, a resilient filler layer 22 securely fixed to the circumference of the rotating body 23, and a cylindrical sleeve 21 securely fitted around the filler layer 22. The cylindrical sleeve 21 is formed of a thin sheet of about 0.05–1.0 mm in thickness, for example, a thin sheet of metallic material as represented by stainless steel, hard steel or the like or a sheet of a synthetic resin material (e.g., an engineering plastic sheet of nylon or the like, particularly a plastic sheet with excellent resistance to abrasive wear) or the like. On the other hand, a soft resilient material such as foamed plastics or rubber is useful for the filler layer 22. As shown particularly in FIG. 5(A), a hermetically closed space 22a is formed on the inner side of the cylindrical sleeve 21, which is filled with compressed air (0.2–2 kg/cm$^2$) or simply filled with a fluid or powdery or granular material such as beads (with a particle diameter of about 0.01–3 mm). In this instance, the opposite axial ends of the cylindrical sleeve 21 are closed with end plates which are secured to the rotary body 23.

The drive shaft 24 of the transfer roller 2 is connected to a known rotational drive mechanism such as pulley 25a and a belt 26 as shown in the drawing and thereby rotated at an appropriate speed mentioned hereinbefore. Further, the sprinkling roller 3 which is mounted in a fixed position in contact with the transfer roller 2 is formed in a solid or hollow drum-like shape and rotated at high speed in the same direction as the transfer roller 2 through a pulley 25b which is provided at one end of the roller 3.

Referring to FIG. 5(B), there is shown an embodiment in which a hermetically closed space 22a is formed around the transfer roller 2 by a tubular bag-like sleeves having outer and inner membranes 21a and 21b which are connected with each other by side membranes at the opposite axial ends. The bag is securely fixed to the rotary body 23 through the inner membrane 21b. Although not shown in the drawing, the filler layer 22 may be formed by laminating a plural number of the above-mentioned soft resilient material and/or hermetically closed space in a stratiform.

Since the sprinkling apparatus is provided with the transfer rollers 2 of the above-described construction, it is possible to hold the circumferential surface of the cylindrical sleeve 21 constantly in contact with the circumferential surface of the opposing sprinkling roller 3 through the axial line contact with the latter. Therefore, as the liquid resin composition $A_o$ on the circumferential surface of the transfer roller 2 is moved downward, it is completely scraped off and sprinkled in a finely divided form by the sprinkling roller 3. Should small dust particles deposit on the surface of the transfer roller, the resiliency of the roller surface suitably prevents the damage which might otherwise be caused thereto. Besides, even if heat is generated by the friction between the transfer and sprinkling rollers 2 and 3, seizure of rollers is prevented by the lubricative and cooling actions of the liquid resin composition. In this connection, for the purpose of reducing the friction, an ethylene polyfluoride resin or other anti-friction material may be coated on the circumferences of the two rollers.

Illustrated in FIGS. 6 and 7 is another embodiment of the invention, in which the transfer roller 2 is composed of a hollow cylindrical body 41, an inner rotary body 42 which presses from inside the peripheral wall of the hollow cylindrical body 41 radially outward, and an outer pressure roller 44 which is located to presses the cylindrical body 41 inward against the inner rotary body 42 to grip same in cooperation with the inner rotary body 42. The inner rotary body 42 has an outer diameter smaller than the inside diameter of the hollow cylindrical body 41, and is located parallelly within the hollow cylindrical body 41 in an eccentric position deviated from the center O' of the latter. The inner rotary body 42 is positioned such that its circumference contacts the inner periphery of the hollow cylindrical body 41 at point D, while the pressure roller 44 is located in a position corresponding to the point D on the outer side of the hollow cylindrical body 41. The pressure roller 44 is rotatably supported at the fore end of an arm 45 which is in turn pivotally supported on a fixed frame 46 and constantly urged in the direction of arrow E by a spring 47. Consequently, the circumferential wall of the hollow cylindrical body 41 is gripped between the inner rotary body 42 and the outer pressure roller 44. The inner rotary body 42 is coupled with a rotational drive source through a rotational shaft 43, which rotates the inner rotary body 42 in the arrowed direction, urging the hollow cylindrical body 41 to rotate therewith in the same direction.

The above-described inner rotary body 42 and outer pressure roller 44 may be provided over the entire axial length of the hollow cylindrical body 41, or may be provided along part of the hollow cylindrical body 41 as shown in FIG. 7. Further, a surface layer of an anti-slip material (e.g., rubber, ceramic material etc.) may be formed around the circumferences of the inner rotary body 42 and outer pressure roller 44 for increasing the friction against the surface of the hollow cylindrical body 41.

On the other hand, the sprinkling roller 3 is located in a fixed position beneath the hollow cylindrical body 41, in contact with the locus of rotation of the outer periphery of the hollow cylindrical body 41.

The above-described hollow cylindrical body 41 is formed of a metallic material such as stainless steel, high tension steel or the like, or a synthetic resin material (e.g., an engineering plastic material such as nylon or the like). Although the wall thickness of the hollow cylindrical body 41 is determined depending upon its outer diameter and the quality of the material, it is preferred to select a thin wall which has rigidity sufficient for retaining shape along with resiliency for buffering the impacts resulting from the contacting rotation while constantly maintaining the resilient contact with the sprinkling roller 3. As indicated by broken line in FIG. 6, a guide roller 49 may be located in a suitable position on the locus of rotation of the hollow cylindrical body 41 for stabilizing the rotation of the latter.

Figure 9:
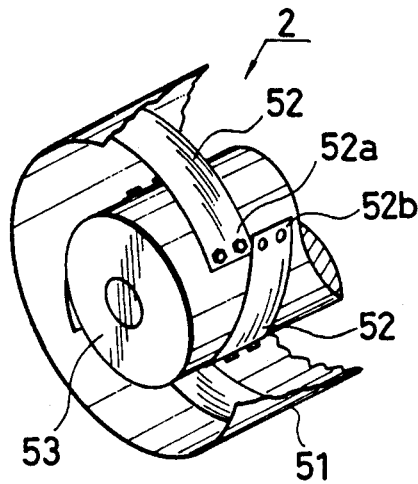
FIG. 9 is a partly cutaway perspective view of the transfer roller shown in FIG. 8.

Shown in FIGS. 8 and 9 is still another embodiment of the invention, in which the transfer roller 2 is composed of a hollow cylindrical body 51, an inner rotary body 53 and spring members 52. The hollow cylindrical body 51 and spring members 52 are formed of a metallic material such as stainless steel, high tension steel or the like, or a synthetic resin material (e.g., an engineering plastic material like nylon or a fiber reinforced composite material like fiber reinforced resin or a fiber reinforced metallic material). Depending upon the properties of the material, the spring members 52 are designed to have rigidity sufficient for retaining the hollow cylindrical body 51 as well as functions of absorbing and buffering the impacts of contacting rotation, imparting resiliency in radial direction to the hollow cylindrical body 51. The wall thickness of the hollow cylindrical body 51 is determined appropriately depending upon the properties of its material, and preferred to be smaller than 1.0 mm in case of stainless steel. The inner rotary body 53 has a diameter smaller than the inside diameter of the hollow cylindrical body 51 and is connected to the hollow cylindrical body 51 in parallel relation with the axis of the latter by four spring members 52, which are each in the form of a curved strip-like leaf spring. Each of the spring member 52 has one end 52a securely fixed to the circumferential surface of the inner rotary body 53 by bolts or other suitable fixing means and the other end 52b securely fixed to the inner periphery of the hollow cylindrical body 51 by welding or other suitable means. With this arrangement, the hollow cylindrical body 51 is connected to the inner rotary body 53 resiliently in radial directions. The inner rotary body 53 is connected to a rotational drive source, which is not shown, and thereby rotated together with the hollow cylindrical body 51. The spring members 52 are not restricted to the leaf springs shown. Namely, the spring members 52 may be substituted with coil springs or air cylinder type pneumatic springs and provided in an arbitrary number of positions.

Figure 10:
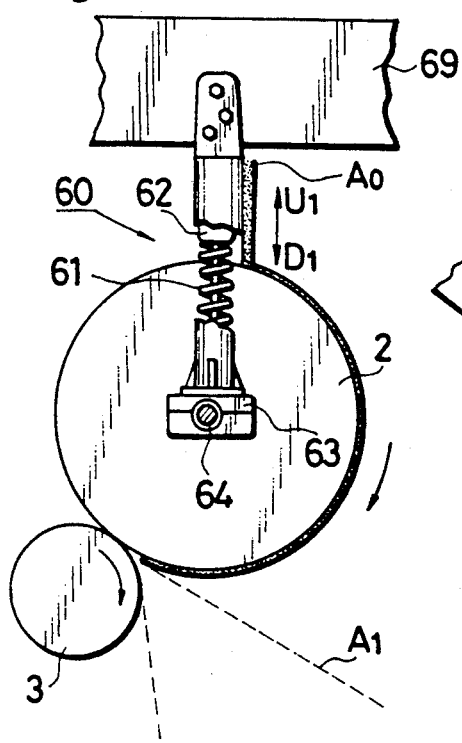
FIGS. 10 and 11 are schematic side views of still further embodiments of the invention.
Figure 11:
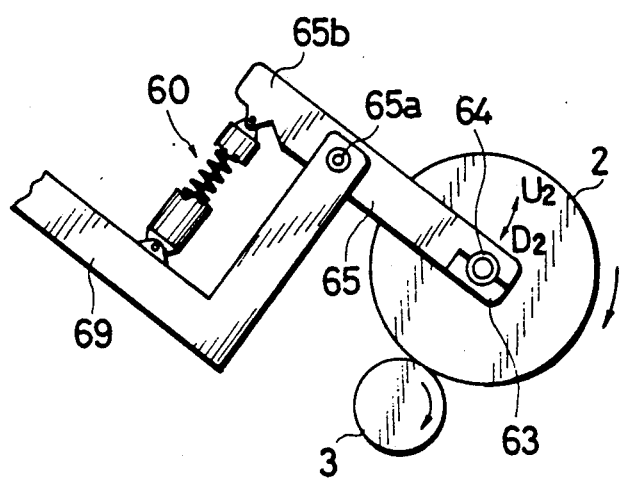

Referring to FIGS. 10 and 11, there are shown further embodiments of the invention, in which the transfer roller 2 is formed in the fashion of a solid or hollow drum which is centrally provided with a rotational shaft 64. The rotational shaft 64 is journalled in bearings 63 and coupled with a drive mechanism which is not shown. In the embodiment of FIG. 10, the bearing 63 is fixedly supported on a stationary machine frame 69 through a pressing buffer 60, which is constituted by a guide cylinder 62 and an expansion spring 61 urging the transfer roller 2 toward the sprinkling roller (in the direction of arrow $D_1$). Namely, the transfer roller 2 is located above the sprinkling roller 3 which is put in high speed rotation in a fixed position, such that the circumferential surface of the transfer roller 2 is held in line contact with the circumferential surface of the sprinkling roller 3 while resiliently absorbing the shocks resulting from the contacting rotation.

The transfer roller 2 shown in FIG. 11 is journalled in bearings 63 on the fore ends of arms 65 which are pivotally supported on a machine frame 69 through pins 65a. A pressing buffer 60 is interposed between the rear end 65b of the arm 65 and the machine frame 69, urging the transfer roller 2 in the direction of arrow $D_2$ by the expanding force of the pressing buffer 60. The pressing buffer 60 is not limited to the construction using a coil spring, and it is utterly a matter of alteration of design to substitute the coil spring of the buffer 60 with other resilient means including leaf spring, air cylinder, rubber or other resilient material and to adapt the mounting construction of the transfer roller 2 to the substitute means.

The invention is illustrated more particularly by the following experimental examples.

EXAMPLE 1

This example employed transfer rollers of the construction shown in FIG. 4, each having a total length of 500 mm and an outside diameter of 150 mm. The cylindrical sleeve 21 was of 0.15 mm thick stainless steel and provided with a filler layer 22 of urethane foam of 8 mm in thickness.

The transfer rollers were rotated at the speed of 150 r.p.m. in abutting contact with a sprinkling roller of 75 mm in outside diameter and rotating at the speed of 6,000 r.p.m. The transfer rollers were supplied with a liquid resin composition (with a viscosity of 800 poise) containing unsaturated polyester resin (EPOLAC N-21, a compound of 60%-unsaturated polyester resin (asid value 25) and 40%-styrene monomer, where the unsaturated polyester resin is condensed with 0.1 mol-iso phthalic acid, 0.9 mol-maleic anhydride, 0.5 mol-neopentyl glycol and 0.55 mol-propylene glycol,

TABLE 1

| Unsaturated polyester resin composition | |
| --- | --- |
| Unsaturated polyester resin (EPOLAC N-21)(%) | 17.9 |
| Low profile additive (EPOLAC AT-100)(%) | 7.7 |
| Filler (calcium carbonate)(%) | 46.8 |
| Mold release agent (zinc stearate)(%) | 1.0 |
| Curing agent (t-butyl peroxybenzoate)(%) | 0.25 |
| Coloring agent (chrome yellow)(%) | 1.1 |
| Thickener (magnesium oxide)(%) | 0.25 |
| Viscosity of resin composition (poise) | 800 |
| Chopped glass fiber strands content(%) | 25.0 |
| Length of chopped glass fiber strands (mm) | 12 |

EXAMPLE 2

This example employed transfer rollers of the construction shown in FIG. 6, each with a hollow cylindrical body 41 of 0.5 mm thick stainless steel having an outside diameter of 200 mm. A molding material was produced under the same conditions as in Example 1.

EXAMPLE 3

This example employed transfer rollers of the construction shown in FIG. 8, each with a hollow cylindrical body 51 of 0.5 mm thick stainless steel and four strip-like spring members of 0.3 mm thick stainless steel, producing a molding material under the same conditions as in Example 1.

EXAMPLE 4

This example employed transfer rollers of the construction shown in FIG. 10, biasing each transfer roller in the direction of arrow $D_1$ by applying thereto a pressure of 5-10 kg. A molding material under the same conditions as in Example 1.

In the foregoing Examples 1 to 4, no solidified resin composition was observed on the surfaces of the transfer roller 2 moving in contact with the sprinking roller.

Accordingly, it was possible to prevent entrainment into the mixed material of the solidified resin fragments which would impair the quality of the resinous material of the ultimate product, thus permitting to produce continuously a fiber reinforced resinous molding material of uniform quality.

What is claimed is:

1. A resin composition sprinkling apparatus comprising:
    a transfer roller for receiving a supply of liquid resin composition on the circumferential surface thereof; and
    a sprinkling roller having the axis thereof disposed parallel with the axis of said transfer roller and rotated in the same direction as said transfer roller for sprinkling said liquid resin composition in finely divided form,
    wherein said transfer roller has the circumferential surface thereof held in contact with the circumferential surface of said sprinkling roller rotating in a fixed position and is supported resiliently relative to the circumferential surface of said sprinkling roller for absorbing shocks resulting from contacting rotation; and
    wherein said transfer roller includes an outer hollow cylindrical body and an inner rotary body disposed within said outer cylindrical body and connected to a rotational drive source.

2. A resin composition sprinkling mechanism as defined in claim 1, further comprising a filler layer of a resilient material provided between said outer cylindrical body and said inner rotary body.

3. A resin composition sprinkling mechanism as defined in claim 2, wherein said outer cylindrical body is formed of stainless steel and said resilient material is synthetic resin foam.

4. A resin composition sprinkling mechanism as defined in claim 1, further comprising a hermetically closed space formed between said outer cylindrical body and said inner rotary body, and filled with compressed air, a liquid or a particulate material.

5. A resin composition sprinkling mechanism as defined in claim 4, wherein said outer cylindrical body is of a tubular shape having inner and outer membranes and forming a hermetically closed space between said inner and outer membranes, said inner membrane being securely fixed to said inner rotary body.

6. A resin composition sprinkling mechanism as defined in claim 1, further comprising spring members interposed between said outer cylindrical body and said inner rotary body.

7. A resin composition sprinkling mechanism as defined in claim 6, wherein said spring members are each in the form of an arcuate leaf spring.

8. A resin composition sprinkling mechanism as defined in claim 1, wherein said inner rotary body is formed in a diameter smaller than said outer cylindrical body and is located in an eccentric position deviated from the center of said outer cylindrical body, and has the outer periphery thereof held in line contact with the inner periphery of said outer cylindrical body, and a pressure roller is provided on the outer side of said outer cylindrical body, said pressure roller being urged to press said outer cylindrical body from outside toward said contact line.

9. A resin composition sprinkling mechanism as defined in claim 1, wherein said transfer roller is provided with a rotational shaft, which rotational shaft being journalled in a bearing constantly urged toward said sprinkling roller by a pressing buffer member.

* * * * *

UNITED STATES PATENT AND TRADEMARK OFFICE
CERTIFICATE OF CORRECTION

PATENT NO. : 4,989,538

DATED : February 5, 1991

INVENTOR(S) : KATSUSHIGE TAMURA ET AL

Page 1 of 2

It is certified that error appears in the above-identified patent and that said Letters Patent is hereby corrected as shown below:

In column 6, line 43, after "glycol," insert --a product of Nippon Shokubai Kagaku Co. Ltd.) as a major component among other ingredients shown in Table 1. The resin composition spread and sprinkled by the sprinkling rollers was mixed with 0.5 inch chopped reinforcing glass fiber, producing a plate-like molding material by an apparatus as shown in Fig. 1.--.

In column 6, line 47, after "N-21" insert --a compound of 60%-unsaturated polyester resin (asid value 25) and 40%-styrene monomer, where the unsaturated polyester resin is condensed with 0.1 mol-iso phthalic acid, 0.9 mol-maleic anhydride, 0.5 mol-neopentyl glycol and 0.55 mol-propylene glycol--.

UNITED STATES PATENT AND TRADEMARK OFFICE
CERTIFICATE OF CORRECTION

PATENT NO. : 4,989,538
DATED : February 5, 1991
INVENTOR(S) : KATSUSHIGE TAMURA ET AL It is certified that error appears in the above-identified patent and that said Letters Patent is hereby corrected as shown below:

In column 6, line 48, after "AT-100" insert --, compound of 30% polystyrene and 70% styrene monomer--.

Signed and Sealed this

Fifteenth Day of March, 1994

Attest:

BRUCE LEHMAN

*Attesting Officer*        *Commissioner of Patents and Trademarks*